United States Patent [19]

Showalter et al.

[11] Patent Number: 5,771,477
[45] Date of Patent: Jun. 23, 1998

[54] METHOD AND APPARATUS FOR SYNCHRONIZING LOW TO HIGH TRANSFER CASE SHIFTS

[75] Inventors: Dan J. Showalter, Plymouth; Richard K. Rader, West Bloomfield; Gary Oliveira, Auburn Hills; E. David Ray, Holly, all of Mich.

[73] Assignee: Borg-Warner Automotive, Inc., Sterling Heights, Mich.

[21] Appl. No.: 626,055

[22] Filed: May 10, 1996

[51] Int. Cl.$^6$ .......................... B60K 17/346; F16H 37/08
[52] U.S. Cl. .................. 701/51; 701/61; 701/67; 701/69; 180/247; 180/248; 475/295
[58] Field of Search .................... 701/51, 61, 66, 701/67, 69; 180/247, 248, 249, 250; 475/295, 221

[56] References Cited

U.S. PATENT DOCUMENTS

| | | | |
|---|---|---|---|
| 4,718,303 | 1/1988 | Fogelberg | 74/710.5 |
| 4,828,070 | 5/1989 | Maramatsu | 180/247 |
| 5,407,024 | 4/1995 | Watson et al. | 180/248 |
| 5,409,429 | 4/1995 | Showalter et al. | 475/295 |
| 5,662,543 | 9/1997 | Forsyth | 180/249 |
| 5,674,147 | 10/1997 | Tobita et al. | 475/295 |

FOREIGN PATENT DOCUMENTS

| | | | |
|---|---|---|---|
| 1 276 554 | 6/1972 | United Kingdom | F16H 5/50 |
| 1 604 773 | 12/1981 | United Kingdom | B60K 41/08 |
| 2 159 899 | 12/1985 | United Kingdom | F16H 5/84 |

*Primary Examiner*—Tan Q. Nguyen
*Attorney, Agent, or Firm*—Brinks Hofer, Gilson & Lione; Greg Dziegielewski

[57] ABSTRACT

A method and apparatus for operating a power transfer device such as a vehicle transfer case having, shaft speed sensors, a two speed (high-low) drive assembly, an electrically, pneumatically or hydraulically operated shift operator and a microprocessor comprising the steps of sensing the speeds of the transfer case input shaft and output shaft, calculating the rate of change ($\Delta S/\Delta t$) of the speed of the input shaft, predicting, based upon such rate of change, a time when the input shaft and the output shaft will be synchronized and commencing movement of such shift operator at a time prior to such synchronization in order to effect engagement of such clutch into high gear at substantially the instant of synchronization.

22 Claims, 3 Drawing Sheets

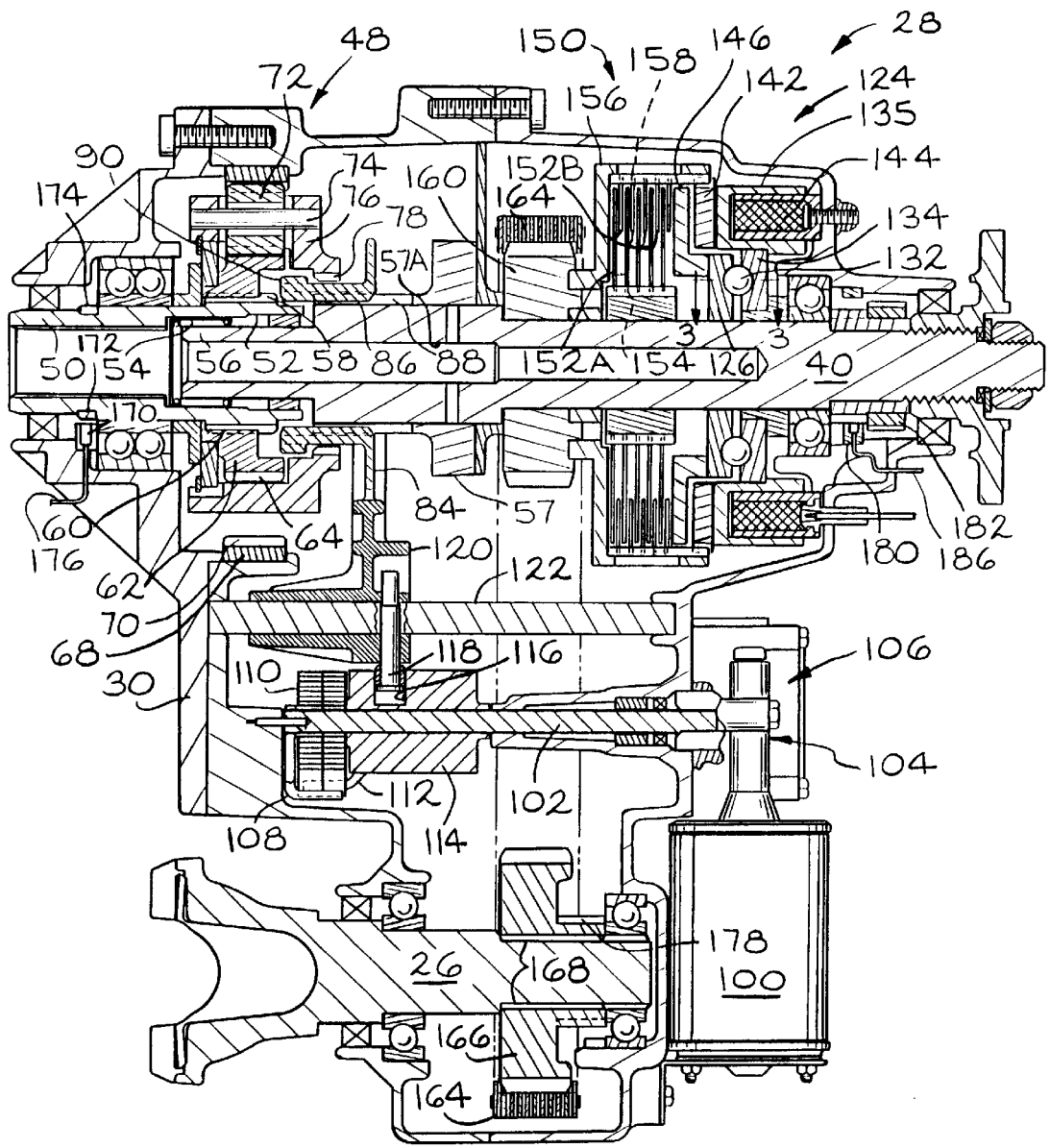
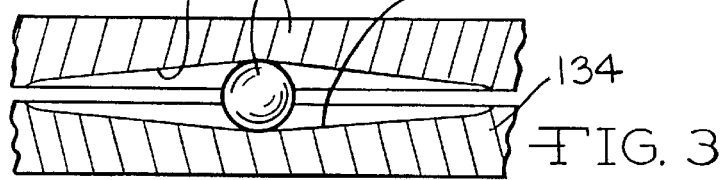

METHOD AND APPARATUS FOR SYNCHRONIZING LOW TO HIGH TRANSFER CASE SHIFTS

BACKGROUND OF THE INVENTION

The invention relates generally to two speed (high-low) transfer cases and more particularly to a low to high shift arrangement for a two speed transfer case which senses transfer case input and output shaft speeds and commences operation of the shift mechanism prior to synchronism.

Although the transfer case is the heart of essentially all part-time four wheel drive systems and the benefits that this system provides during both on road and off road operation are readily acknowledged, the incorporation of a transfer case can never be said to simplify the overall vehicle driveline configuration or operation. For example, while shifts into and out of four wheel drive can be done on the fly, it was not uncommon that the configuration of the transfer case required that the vehicle being stopped before low gear could be engaged. A similar situation also exists with regard to shifting back to high gear from low gear. This is typically the result of conventional transfer cases lacking any type of synchronizer to facilitate such shifts.

One solution to this problem has been to provide a modulatable, i.e., soft, clutch which can be partially engaged to drive the two shafts into synchronism. This solution does, however, necessitate the incorporation of a second, relatively costly clutch in addition to the direct, dog clutch.

Another less costly solution to the problem of low to high synchronism comprehends spring biasing the dog clutch member relative to its operator such that the high to low or low to high shift is only completed when the shafts are in substantial synchronism which allows the clutch components to engage. This arrangement is disadvantageous in that even though the shift may have been commanded and the shift operator may have completed its movement, the shift will not be completed until the shaft speeds are substantially synchronized. In the meantime, the clutch gear teeth or splines will slip past one another without transferring torque and while producing some noise.

It is apparent from the foregoing that these and other schemes for achieving on the fly high to low and low to high shift are not without shortcomings and that other, less complex and more sophisticated devices and operating schemes are desirable.

SUMMARY OF THE INVENTION

A method and apparatus for operating a power transfer device such as a vehicle transfer case having shaft speed sensors, a two speed (high-low) drive assembly, a electrically, pneumatically or hydraulically operated shift operator and a microprocessor comprising the steps of sensing the speeds of the transfer case input shaft and output shaft, calculating the rate of change ($\Delta S/\Delta t$) of the speed of the input shaft, predicting, based upon such rate of change, a time when the input shaft and the output shaft will be synchronized and commencing movement of such shift operator at a time prior to such synchronization in order to effect engagement of such clutch into high gear at substantially the instant synchronization is achieved.

Thus it is an object of the present invention to provide an apparatus for achieving smooth low to high shifts in a two speed power transfer device.

Thus it is a further object of the present invention to provide an apparatus for achieving smooth low to high, on-the-fly shifts in a two speed transfer case.

It is a further object of the present invention to provide a two speed transfer case having input and output shaft speed sensors and a microprocessor which predicts when the shafts will be in synchronism during an upshift.

It is a still further object of the present invention to provide a two speed transfer case having input and output shaft speed sensors and a microprocessor which begins movement of the gear selector a predetermined time before shaft synchronization occurs.

It is a still further object of the present invention to provide a two speed transfer case having input and output shaft speed sensors and a microprocessor which predicts when such shaft speeds will be equal and commences operation of a shift operator a predetermined time before shaft synchronism, such predetermined time equal to the delay between activating such operator and engagement of such high gear.

It is a still further object of the present invention to provide a method of operating a two speed transfer case to provide improved low to high range shifts.

It is a still further object of the present invention to provide a method of operating a two speed transfer case wherein input and output shaft speeds are sensed and movement of such speed range clutch operator is commenced before shaft synchronism.

It is a still further object of the present invention to provide a method of operating a two-speed transfer case wherein input and output shaft speeds are sensed and movement of such speed range clutch operator is commenced a predetermined time before shaft synchronism is achieved, such predetermined time equal to the delay between energizing such shift operator and engagement of such high range.

Further objects and advantages of the present invention will become apparent by reference to the following description of the preferred embodiment and appended drawings wherein like reference numbers refer to the same component, element or feature in the various drawings.

BRIEF DESCRIPTION OF THE DRAWINGS

FIG. 2 is a full, sectional view of a two speed transfer case according to the present invention;

FIG. 3 is a flat pattern development of the load transferring balls and ramp in the modulating clutch of the transfer case;

DESCRIPTION OF THE PREFERRED EMBODIMENT

Figure 1:
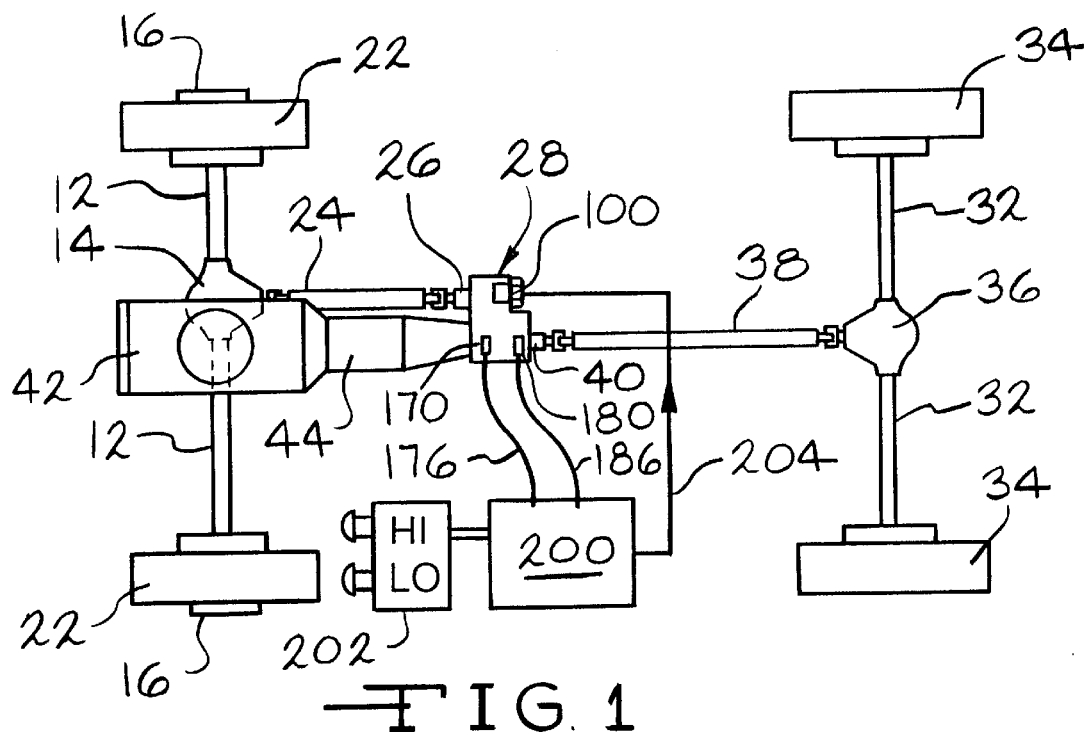
FIG. 1 is a schematic view of a vehicle driveline, speed sensors and associated components of a synchronous shift system according to the present invention.

Referring now to FIG. 1, a vehicle having a four wheel drive system and a two speed transfer case incorporating the present invention is schematically illustrated and generally designated by the reference numeral 10. The vehicle 10 includes a pair of front (secondary) axles 12 which are centrally coupled to a front (secondary) differential 14. The outer ends of the front (secondary) axles 12 may be connected to a respective pair of locking hubs 16. The locking hubs 16 are preferably vacuum operated and are in fluid communication with a controlled vacuum source (not illustrated) through vacuum lines 20. When a vacuum is present in the vacuum lines 20, the hubs 16 lock and couple the front (secondary) axles 12 to a respective pair of front (secondary) tire and wheel assemblies 22. It will be appreciated that electrically operated locking hubs 16 or mechanically operated locking hubs 16 may be utilized with the present invention. As a first alternative, live front (secondary) axles 12 may be utilized with a front (secondary) axle disconnect (not illustrated) disposed in the front (secondary) differential 14. As a further alternative, the front (secondary) axles 12 may be permanently coupled to both the front tire and wheel assemblies 22 and the front differential 14 and driven by its input. The front differential 14 is driven by a front (secondary) drive or prop shaft 24 which, in turn, is driven by the front (secondary) output shaft 26 of a transfer case 28.

To the rear of the vehicle are disposed a pair of aligned rear (primary) axles 32. The outer ends of the axles 32 are coupled to rear (primary) tire and wheel assemblies 34 and their opposite ends are coupled to and driven by a rear (primary) differential 36. The rear differential 36, in turn, is driven by a rear (primary) drive or prop shaft 38 which is, in turn, driven by a rear (primary) output shaft 40 of the transfer case 28. It will be appreciated that the various aforementioned shafts are coupled by a plurality of universal joints as needed in accordance with conventional vehicle drive train practice. A prime mover, such as an internal combustion engine 42 drives a conventional transmission 44 which may be either a manual transmission with a clutch or an automatic transmission.

The designations "primary" and "secondary" appearing above refer to drivelines in a vehicle 10, primarily and secondarily intended to propel the vehicle 10. In the following description, the inventor describe a system in which the rear drive shaft 38 transmits all drive torque to the rear wheels 34 in two-wheel drive and delivers a portion of the torque in the four-wheel mode. Accordingly, in the vehicle 10, the rear drive shaft 38 may, more generically, be referred to or designated the primary drive or prop shaft 38 and this shaft 38 and the associated components, the axles 32, the rear tire and wheel assemblies 34 and the rear differential 36, constitute the primary driveline. Conversely, the front drive shaft 24 is disengaged in two-wheel drive mode and will transfer drive torque in the four-wheel drive mode. Thus, the front drive shaft 24 may, more generically, be referred to or designated the secondary drive or prop shaft 24 and this shaft 24 and the associated components, the front axles 12, the front differential 14, the locking hubs 16, the front tire and wheel assemblies 22 constitute the secondary driveline.

It should be understood that the driveline components of the vehicle 10 described herein are fully suitable for use with vehicle drive systems conventionally designated front wheel drive where the front drive shaft 24 and associated components will be the primary driveline and the rear drive shaft 38 and associated components will thus be the secondary driveline.

Referring now to FIG. 2, the transfer case 28 includes a housing 30 which is preferably cast of metal in two mating sections and includes apertures, blind openings, threaded openings, supports, bearing receiving surfaces and other features specially adapted to receive the components of the transfer case 28. The transfer case 28 also includes a planetary gear assembly 48 which is driven by an input shaft 50 rotatably disposed within the transfer case 28. The input shaft 50 is coupled to and driven by the output of the transmission 44. The input shaft 50 defines a re-entrant bore 52 which receives a roller bearing assembly 54. The roller bearing assembly 54, in turn, receives and rotatably supports the forward terminus 56 of the rear (primary) output shaft 40 of the transfer case 28. A gerotor pump 57 is secured about and rotates with the output shaft 40, providing lubricating fluid under pressure to a passageway 57A which extends axially within the output shaft 40 and distributes lubricating fluid to components of the transfer case 28.

Turning now to a description of the planetary gear assembly 48, the exterior surface of the input shaft 50 defines a plurality of external teeth 58 which engage complementarily formed teeth 60 on the inner circular surface of a sun gear 62. The sun gear 62 is thus coupled to the input shaft 50 for rotation therewith. The sun gear 62 includes gear teeth 64 about its periphery. Aligned with the sun gear teeth 64 is a ring gear 68 having inwardly directed gear teeth 70. A plurality of pinion gears 72 are rotatably received upon a like plurality of stub shafts 74 which are mounted within a carrier 76. The carrier 76 includes a plurality of inwardly directed teeth 78 on a surface generally adjacent the external teeth 58 defined by the input shaft 50. The planetary gear assembly 48 is more fully described in co-owned U.S. Pat. No. 4,440,042 which is incorporated herein by reference.

An axially sliding, i.e., dog type, clutch 84 is received about the output shaft 40. The clutch 84 defines an inwardly directed plurality of teeth 86 which are complementary to and mate with a like plurality of external teeth 88 disposed on the output shaft 40. The dog clutch 84 thus rotates with the output shaft 40 but may slide axially therealong. The teeth 86 are also complementary to the external teeth 58 on the input shaft 50. The dog clutch 84 also includes a plurality of external teeth 90 which are complementary to the teeth 78 disposed on the carrier 76 and which may be selectively mated therewith.

The dog clutch 84 is axially translatable between a first, forward position wherein the external teeth 58 couple with the teeth 86 and thus provide direct drive between the input shaft 50 and the output shaft 40. Translated fully to the rear, the dog clutch 84 couples the carrier 76 to the output shaft 40 through the mating of the teeth 78 and the external teeth 90. In this position, the speed of the output shaft 40 relative to the input shaft 50 is reduced in accordance with the selected gear ratio of the planetary gear assembly 48 which typically is in the range of from 2:1 to 4:1. The dog clutch 84 may be also moved to a third, neutral position, mid-way between the forward, direct drive position and the rear, reduced speed drive position. In the middle position, the input shaft 50 is disconnected from the output shaft 40 and no torque is transferred therebetween.

The position of the dog clutch 84 is commanded by an electric shift control motor 100. The electric shift control motor 100 rotates a drive shaft 102 through a worm gear drive 104. The drive shaft 102 is suitably supported for rotation with the housing 30 of the transfer case 28. The position of the drive shaft 102 may be monitored and read by an encoder assembly 106 which provides information about the current position of the drive shaft 102 and thus the dog clutch 84.

The drive shaft 102 terminates in an arm 108 which is coupled to a spring assembly 110. The spring assembly 110 is wrapped about the drive shaft 102 and is also engaged by an arm 112 which extends axially from a cylindrical cam 114. The spring assembly 110 functions as a resilient coupling between the drive shaft 102 and the cylindrical cam 114 to absorb lag between the movement commanded by the drive motor 100 and the driven components so that the shift motor 100 is allowed to reach its final requested position. The spring assembly 110 allows smooth and fast response to a requested repositioning of the dog clutch 84 in situations where the inwardly directed teeth 86 of the dog clutch 84 do not instantaneously engage the external teeth 58 of the input shaft 50 or the external teeth 90 of the dog clutch 84 do not instantaneously engage the teeth 78 of the carrier 76 such as when the vehicle 10 is stationary. When rotation of the input shaft 50 allows engagement of the aforementioned clutch teeth, potential energy stored in the spring assembly 110 rotates the cylindrical cam 114 to its requested position, thus completing the shift.

The cylindrical cam 114 defines a helical track 116 which extends approximately 270° about the cam 114. The helical track 116 receives a pin and cam follower 118 which is coupled to and translates a fork assembly 120. The fork assembly 120 is supported for bi-directional translation upon a fixed shaft 122 and engages the periphery of the dog clutch 84. Rotation of the shaft 102 axially repositions the cam follower assembly 118 and axially positions the dog clutch 84 in one of the three positions described above.

Referring now to FIGS. 2 and 3, the transfer case 28 also includes an electromagnetic clutch assembly 124. The electromagnetic clutch assembly 124 is disposed about the output shaft 40 and includes a circular drive member 126 coupled to the output shaft 40 through a splined interconnection. The circular drive member 126 includes a plurality of circumferentially spaced apart recesses 130A in the shape of an oblique section of a helical torus, as illustrated in FIG. 3. Each of the recesses 130A receives one of a like plurality of load transferring balls 132.

A circular driven member 134 is freely rotatably disposed on the output shaft 40 adjacent the circular drive member 136 and includes a like plurality of opposed recesses 130B defining the same shape as the recesses 130A. The oblique side walls of the recesses 130A and 130B function as ramps or cams and cooperate with the balls 132 to drive the circular members 126 and 134 apart in response to relative rotation therebetween. It will be appreciated that the recesses 130A and 130B and the load transferring balls 132 may be replaced with other analogous mechanical elements which cause axial displacement of the circular members 126 and 134 in response to relative rotation therebetween. For example, tapered rollers disposed in complementarily configured conical helices may be utilized.

The periphery of the circular driven member 134 engages and is tightly secured to an rotor 135. The rotor 135 is circular, defines a U-shape in cross section and includes a circular clutch face 136 which is disposed in opposed relationship with complementary clutch face 137 on an armature 138. Sets of interengaging splines 142 cause the armature 138 to rotate with the housing of the disc pack clutch assembly 150.

The rotor 135 surrounds a circular, stationary electromagnetic coil 144 on three sides. The electromagnetic coil 144 is provided with electrical energy from a suitable controller. Increasing or decreasing the current to the coil 144 of the electromagnetic clutch assembly 124 increases and decreases the torque throughput of the clutch 124. It will be appreciated that various modulating control techniques may be utilized to achieve engagement, control and disengagement of the electromagnetic clutch assembly 124.

Providing electrical energy to the electromagnetic coil 144 causes magnetic attraction of the armature 138 to the rotor 135. This magnetic attraction results in frictional contact between the circular clutch faces 136 and 137. When the output shaft 40 is turning at a different speed than the armature 138 which turns at the same rotational speed as the secondary output shaft 26, this frictional contact results in a frictional torque being transferred from the output shaft 40, through the circular drive member 126, through the load transferring balls 132 and to the circular driven member 134. The resulting frictional torque causes the balls 132 to ride up the ramps of the recesses 130A and 130B, axially displacing the circular drive member 126. Axial displacement of the circular drive member 126 translates an apply plate 146 which is splined to the output shaft 40 and a washer 148 disposed between the armature 138 and the apply plate 146 axially toward a disc pack clutch assembly 150. A compression spring 151 provides a restoring force which biases the circular drive member 126 toward the circular driven member 134 and returns the load transferring balls 132 to center positions in the recesses 130A and 130B to provide maximum clearance and minimum friction between the components of the electromagnetic clutch assembly 124 when it is deactivated.

An important design consideration of the recesses 130A and 130B and the balls 132, the washer 148, the compression spring 151 and the clearances in the clutch assembly 124 is that the overall configuration not be self-locking. The electromagnetic clutch assembly 124 must not self-engage but rather must be capable of modulated clamping of the disc pack clutch assembly 150 and torque transfer in direct response to the electrical control input.

The disc pack clutch assembly 150 includes a plurality of interleaved friction plates or discs 152. A first plurality of discs 152A are coupled by interengaging splines 154 to a clutch hub 155 which is coupled to the output shaft 40 for rotation therewith. A second plurality of discs 152B are coupled to an annular housing 156 by interengaging splines 158 for rotation therewith.

It should be understood that while the electromagnetic clutch assembly 124 described above incorporates electromagnetic activation means, it may also be operated in the same manner by hydraulic or pneumatic operators provided with controlled pressurized hydraulic fluid or pressurized air, respectively.

The annular housing 156 is disposed for free rotation about the output shaft 40 and is coupled to a chain drive sprocket 160 by a plurality of interengaging lugs and recesses 162. The drive sprocket 160 is also rotatably disposed on the output shaft 40. When the electromagnetic clutch assembly 124 is engaged, it transfers energy from the output shaft 40 to the chain drive sprocket 160. A drive chain 164 is received upon the teeth of the chain drive sprocket 160 and engages and transfers rotational energy to a driven chain sprocket 166. The driven sprocket 166 is coupled to the front (secondary) output shaft 26 of the transfer case 28 by interengaging splines 168.

The transfer case 28 also includes a first Hall effect sensor 170 which is disposed in proximate, sensing relationship with a plurality of teeth 172 on a tone wheel 174 which is coupled to and rotates with the front input shaft 50. The output of the first Hall effect sensor is carried in electrical conductors 176. A second Hall effect sensor 180 is disposed in proximate, sensing relationship with a plurality of teeth 182 of a tone wheel 184 disposed on the rear (primary) output shaft 40. The output of the second Hall effect sensor is carried in electrical conductors 186. Preferably, the number of teeth 172 on the tone wheel 174 is identical to the number of teeth 182 on the tone wheel 184 so that identical shaft speeds result in the same number of pulses per unit time from the Hall effect sensors 170 and 180. This simplifies computations relating to shaft speeds and improves the accuracy of all logic decisions based on such data and computations. As to the actual number of teeth 172 on the tone wheel 174 and teeth 182 on the tone wheel 184, it may vary from twenty-five to fifty or more or fewer depending upon rotational speeds and sensor construction.

The first and second Hall effect sensors 170 and 180 sense the respective adjacent teeth 172 and 182 and provide a series of pulses which may be utilized to compute the instantaneous rotational speeds of the input shaft 50 and the rear output shaft 40 which, of course, correspond to the rotational speeds of the output of the transmission 44 and the rear drive shaft 38, respectively.

Hall effect sensors are preferred inasmuch as they provide an output signal which alternates between a well defined high and low signal value as the sensed teeth pass. It will be appreciated that other sensing devices such as, for example, variable reluctance sensors may be utilized. Such sensors do not, however, provide the clean wave form provided by Hall effect sensors, particularly at low shaft speeds, and thus may require extra input conditioning to provide useable data. It should also be appreciated that the Hall effect sensors 170 and 180 and their respective adjacent teeth 172 and 182 are preferably located within the housing 30 of the transfer case 28 but may be located at any convenient site along the transmission output/transfer case input shaft 50 and the rear (primary) output shaft 40 and primary driveline. It is also possible to sense the speed of either or both shafts through a gear reduction unit such as the rear differential 36 if proper scaling factors are included in a signal processor to compensate for the gear ratio of the unit. Thus, the properly scaled outputs of rear wheel speed sensors utilized with an anti-lock brake system, for example, could be averaged to provide the speed of the output shaft 40 subject to the caveat noted above regarding speed sensing at diverse locations along the drivelines.

Referring again to FIG. 1, the signal from the first Hall effect sensor 170 carried in the conductors 176 is provided to a microprocessor 200. Likewise, the signal from the second Hall effect sensor 180 carried in the conductors 186 is provided to the microprocessor 200. The microprocessor 200 also receives inputs from an operator controlled selector switch 202 which allows manual selection by the operator of either the low or high gear range of the transfer case 28. Signals commanding selection of the operator selected gear range are provided to the shift control motor 100 from the microprocessor 200 through the electrical conductors 204.

Figure 4:
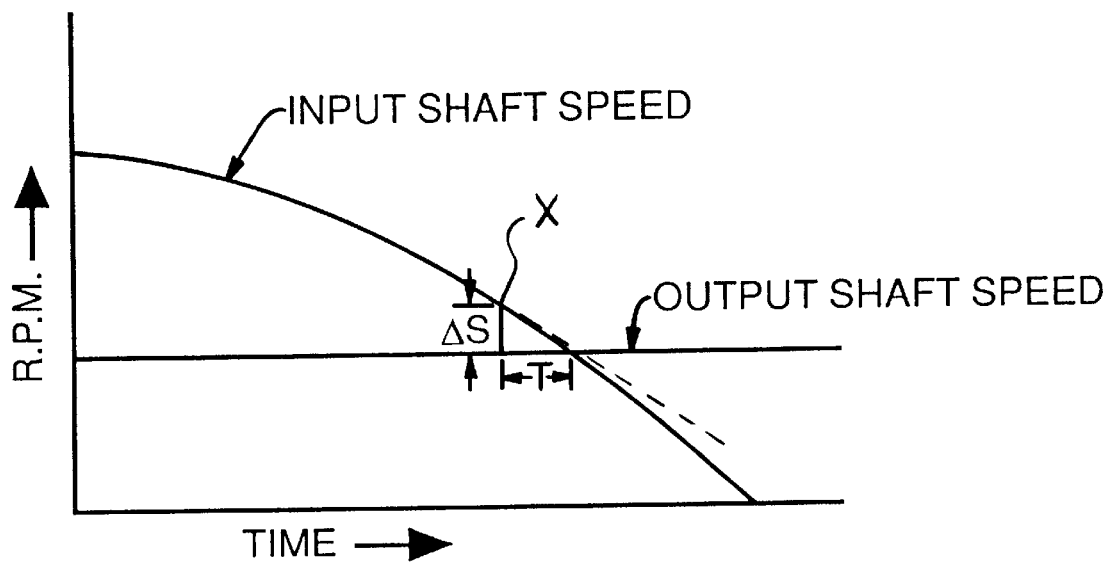
FIG. 4 is a graph illustrating the speed versus time activity of the input and output shafts of a transfer case according to the present invention after the two speed drive has been placed in neutral.
Figure 5:
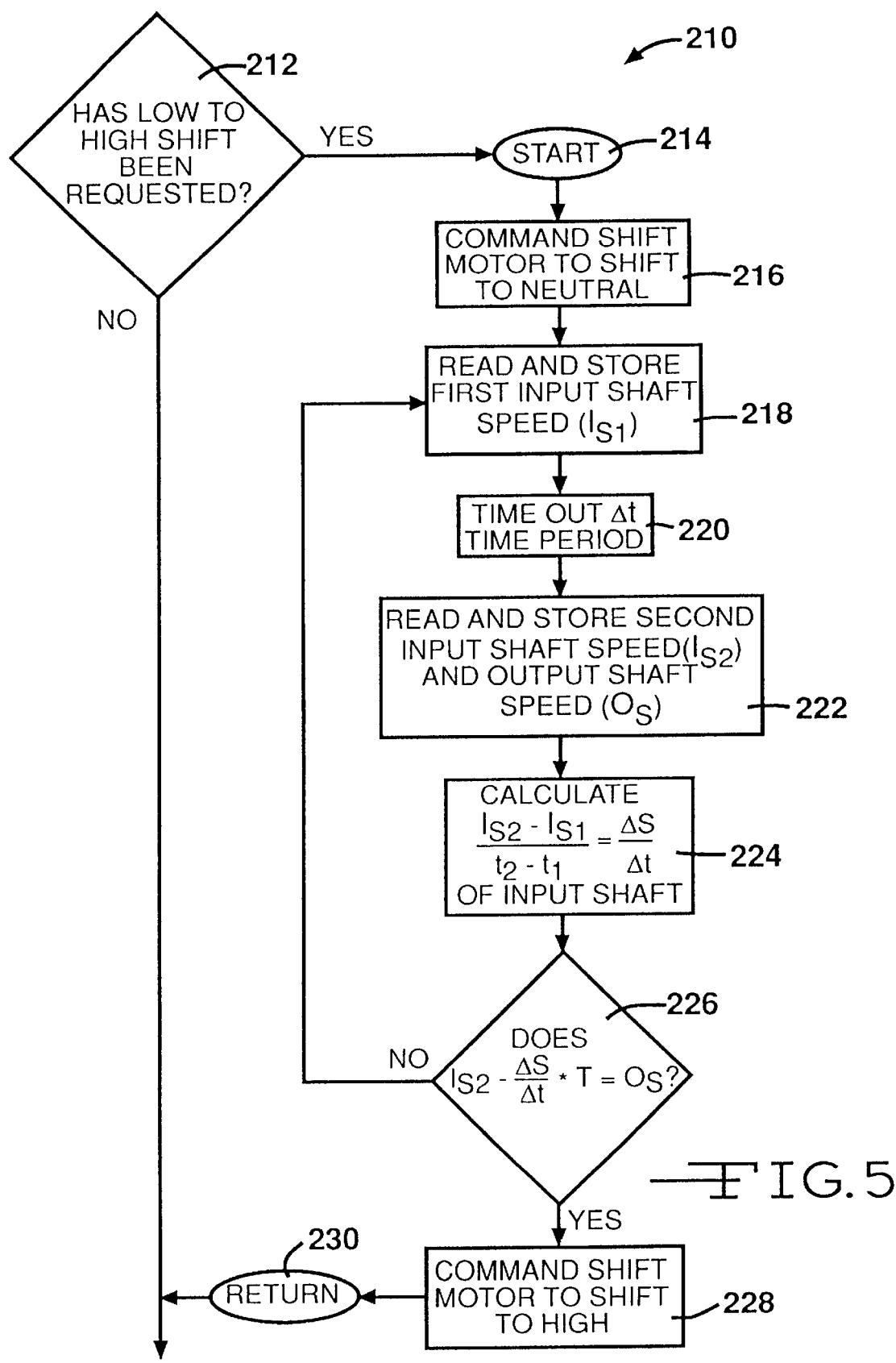
FIG. 5 is a flow chart presenting the operational step occurring in the microprocessor of the present invention.

Referring now to FIGS. 4 and 5, the theory of operation of the invention will first be described and then the microprocessor steps which perform the invention will be presented.

FIG. 4 illustrates the speed of the input shaft 50 and speed of the output shaft 40 of a typical transfer case 28 after a low to high shift has been commanded by the vehicle operator and the shift control motor 100 has moved the dog clutch 84 from its low range position, that is, the position to the right of that illustrated in FIG. 2 to the neutral position, that is, the position in which the dog clutch 84 is illustrated. In this condition, the vehicle 10 will be moving at a relatively constant speed as reflected by the horizontal line in FIG. 4 designated as a speed of the output shaft 40. Depending upon the horizontal time scale and also the activity of the vehicle 10, this line may have a slightly downward slope to the right reflecting the slowing speed of the vehicle 10. However, given the total horizontal time scale encompassed by the graph, which is on the order of one second, the assumption that the speed of the output shaft 40 is constant during this time is reasonable and appropriate.

The speed of the input shaft 50, however, is slowing relatively quickly. This, of course, is due to the fact that the transfer case planetary gear assembly 48 has just been shifted out of low gear—an operating condition in which the engine 42, the output of the transmission 44 and the input shaft 50 was rotating between two and four times faster than the output shaft 40. When the low to high range shift has begun and the dog clutch 84 is disengaged, typically the throttle of the engine 42 will be at or near idle and thus the output speed of the transmission 44 and the input shaft speed 50 to the transfer case 28 will be dropping.

Given these conditions, it is apparent that the rotational speeds of the input shaft 50 and output shaft 40 will achieve synchronism at some point after the dog clutch 84 is driven to its neutral position. The point of synchronism is labeled X in FIG. 4. If the command to shift the control motor 100 and the dog clutch 84 into their high gear position is not issued until synchronism of the shafts 40 and 50 is achieved, mechanical delays in the shift linkage will result in an attempt to engage high gear after the input shaft speed has dropped below the speed of the output shaft 40 causing an unsatisfactory, noisy shift resulting from gear clashing. In the worst case, a shift into high gear may not be possible at all.

Referring now to FIGS. 4 and 5, the microprocessor 200 including a subroutine 210 which relates to this invention and may be one of a number of other programs or subroutines such as those disclosed in co-owned U.S. Pat. No. 5,407,024. The subroutine 210 controls the shift control motor 100 to achieve a virtually undetectable, on-the-fly shift of the planetary assembly 48 of the transfer case 28 from low range to high range. Before the subroutine 210 is entered, an inquiry or decision point 212 which will typically form a portion of an executive system or large control loop in a microprocessor vehicle management system (not illustrated) monitors or detects whether the selector switch 202 has been placed into the high position such that a low to high shift has been requested. If such a shift has not been requested, the related executive system or subroutine continues with other interrogation, computations and actions.

If a low to high shift has been requested, the decision point 212 is exited at YES and the subroutine 210 relating to the synchronized low to high shift commences. Alternatively, and in the most generalized application and description, the subroutine 210 commences with an initializing, start step 214 which clears all registers and erases any data held in memory. The subroutine 210 then proceeds to a process step 216 which commands the shift control motor 100 to disengage low gear and shift to its middle or neutral position as illustrated in FIG. 2. The subroutine 210 then moves to a second process step which reads a first or initial speed of the input shaft 50 and stores this data. This initial speed of the input shaft 50 is designated $I_{s1}$. The subroutine 210 then moves to a second process step 220 which is a delay or timing step which times out a short period of time ($\Delta t$) on the order of twelve to thirty milliseconds. In current prototypes, good performance has been achieved with a twenty millisecond $\Delta t$ time period. It will be appreciated that the process step 220 may be achieved by simply a timer or by a decision point loop which iterates until the time period has elapsed. At the conclusion of the $\Delta t$ time period of process step 220, a third process step 220 is undertaken which reads and stores a second speed of the input shaft 50, $I_{s2}$, and also reads and stores the speed of the output shaft 40, $O_s$.

The subroutine 210 then moves to a fourth process step 224 which utilizes the variables $I_{s1}$, $I_{s2}$ and $O_{s2}$ and the fixed time period $\Delta t$ to calculate the rate of change, that is, $\Delta S/\Delta t$ of the speed of the input shaft 50. This calculation, as noted in FIG. 4, is achieved by subtracting the second read speed of the input shaft 50 from the first read speed of the input shaft 50 and dividing by the $\Delta t$ time interval over which the readings were taken. This data is then used in a decision point 226 which enquires whether the then current speed of the input shaft 50, $I_{s2}$, minus the quantity change in the speed of the input shaft 50 per $\Delta t$ times T equals the speed of the output shaft 40. Here, T represents the time interval or delay between activation of the shift motor 100 and first contact of the engaging gears of the high gear ratio namely, external gear teeth 58 of the planetary gear assembly 48 and internal gear teeth 86 on the dog clutch 84.

This number typically will be determined by observation and experimentation with a given transfer case drive assembly and will thus vary from model to model. It is anticipated that T will vary in the range of from 100 milliseconds to 400 milliseconds and perhaps over a somewhat wider range depending upon the torque, gearing and inertia of the shift control motor 100 and associated drive and linkage components. In prototypes undergoing tests, the value of T has been determined to be on the order of 200 milliseconds. Thus, the decision point 226 computes and predicts a time in the future when the speed of the input shaft 50 will equal the speed of the output shaft 40, such computation and prediction being based upon the then current calculated rate of change of speed of the input shaft 50 multiplied by the time delay inherent in the shift control motor 100 and associated components.

If the computation reveals that the calculation will not result in an equality, the decision point 226 is exited at NO, returns to the process step 218 and the subroutine 210 repeats from that step. If the computation of the decision point 226 results in a finding of equality, the decision point 226 is exited at YES and a command is issued by the microprocessor 200 to the shift control motor 100 to commence a shift to high. At a time T after the command to the shift control motor 100 is issued, the speeds of the input shaft 50 and output shaft 40 will be equal, i.e., synchronized. Engagement of the gear teeth 58 and 86 will just be beginning and the shift will be smoothly and noiselessly completed. The subroutine 210 then terminates at step 230 and returns to the executive system or other microprocessor control loop which was exited to perform the subroutine 210.

It is appropriate to consider and appreciate certain aspects of the subroutine 210, particularly the decision point 226. First of all, it will be noted that the equation presented in decision point 226 includes an equal sign. This is the desired and nominal equation. However, depending upon the definition, i.e., accuracy, of the Hall effect sensors 170 and 180, the time period $\Delta t$, the cycle time of the subroutine 210, the rounding off of values in the subroutine 210 and other less significant variables, it may be unlikely that an exact equality will be achieved. Accordingly, while the mathematical equation seeks an equality, from an engineering and application standpoint, a close approximation to shaft speed equality, i.e., synchronism, will and should be considered to satisfy the equation of the decision point 226. Thus the equation may be considered to read:

$$I_{s2} - \frac{\Delta s}{\Delta t} \cdot T \approx O_s$$

An alternative to the use of an approximation in the equation of the decision point 226 is to utilize an equation which is satisfied whenever the speed of the input shaft 50 is equal to or less than the speed of the output shaft 40. This equation acknowledges the fact that the speed of the input shaft 50 will always be greater than the speed of the output shaft 40 when the subroutine 210 begins. This equation eliminates the possibility that either an equality will not be found or an equality within the range of allowed approximations will not be found.

By using a less than or equal expression, it is certain that it will be satisfied at some point. In this case the equation would read:

$$I_{s2} - \frac{\Delta s}{\Delta t} \cdot T \leq O_s$$

A third consideration relates to the straight line extrapolation which is generated in the process step 224 and utilized in the decision point 226 to determine the proper time to commence activation of the shift control motor 100. Inspection of the shape of the curve of the input shaft speed 50 in FIG. 4 reveals that it is decreasing at an increasing rate and thus is convex on its top side. Because it is not a straight line, any extrapolation will include a small but finite error based on the fact that the straight line extrapolation diverges from the curved shape of the input shaft speed graph. For example, in the illustrated example, an extrapolation from point X will indicate that the shaft speeds will match slightly after they, in fact, do. It should be understood, first of all, that such error is so small that it does not generally create shifting difficulties given $\Delta t$ and shift control delay times similar to those recited above. Second of all, with minimal experimentation, and good knowledge of the representative shape of the graph of the speed of the input shaft 50 under idle conditions, a correction can be made to the shift motor delay time T. That is, if the shape of the curve of the speed of the input shaft 50 is such that the subroutine 210 routinely calculates that synchronism will be achieved five milliseconds after it routinely is, the programmed delay of the shift motor 100, T, can be reduced by the same value, for example, from 200 milliseconds to 195 milliseconds to compensate for the inherent computational error caused by such extrapolation.

Another correction can be made if the slope of the graph of the speed of the output shaft 40 is significant and synchronous shifting is not achieved because of such change, it can be taken into consideration in the computations of the microprocessor 200 by determining the output shaft 40 speed slope just as the slope of the input shaft 50 has been determined. In this case the equation of decision point 226 becomes:

$$I_{s1} - \frac{\Delta s}{\Delta t} \cdot T = O_{s2} - T\left(\frac{o_{s2} - o_{s1}}{\Delta t}\right)$$

where $O_{s1}$ equals the speed of the output shaft 40 at the beginning of $\Delta t$ and $O_{s2}$ equals the speed of the output shaft 40 at the end of $\Delta t$.

The foregoing disclosure is the best mode devised by the inventor for practicing this invention. It is apparent, however, that apparatus and methods incorporating modifications and variations will be obvious to one skilled in the art of synchronous gear changing. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A transfer case having a synchronized low to high shift comprising, in combination, an input shaft having a first speed sensor providing an input speed signal, an output shaft having a second speed sensor providing an output speed signal, a two-speed drive assembly having an input driven by said input shaft and a pair of outputs, a first of said pair of outputs providing a high speed drive and a second of said pair of outputs providing a low speed drive, a clutch operably disposed between said two-speed drive assembly and said output shaft for selectively connecting said pair of outputs of said two-speed drive assembly to said output shaft, a clutch operator for achieving such selective connection by said clutch, and a microprocessor for accepting said input and output speed signals, computing a rate of change of said input shaft speed and activating said clutch operator a predetermined time before the speeds of said input shaft and said output shaft are substantially equal.

2. The transfer case of claim 1 wherein said predetermined time is between 100 and 400 milliseconds.

3. The transfer case of claim 1 wherein said two-speed drive assembly is a planetary gear assembly and wherein said high speed drive is direct and said low speed drive is at a reduction in the range of from about 2:1 to 4:1.

4. The transfer case of claim 1 wherein said clutch is a dog clutch bi-directionally translatable along splines disposed on a shaft.

5. The transfer case of claim 1 wherein said clutch includes a neutral position between said high speed and said low speed positions.

6. The transfer case of claim 1 wherein said microprocessor calculates the reduction per unit time in the speed of the input shaft, projects when said input shaft speed and said output shaft speed will be equal and activates said clutch operator such that said speeds will be equal when said clutch commences engagement with said high speed output.

7. The transfer case of claim 1 wherein said speed sensors include Hall effect sensors and tone wheels disposed on said shafts.

8. A synchronizer for a speed change gear assembly comprising, in combination, an input member and a first speed sensor providing a signal corresponding to said input member speed, an output member and a second speed sensor providing a signal corresponding to said output member speed, speed change gearing driven by said input member and a first output providing a direct, higher speed drive and a second output providing a reduced speed drive, a clutch operably disposed between said two outputs of said speed change gearing assembly and said output member, said clutch movable among a first, drive position connecting said direct drive to said output member, a second, neutral position and a third, drive position connecting said reduced speed drive to said output member, a shift operator for selectively moving said clutch among said three positions, and a microprocessor for receiving said input and output speed signals, computing the rate of change of said input member speed and commanding operation of said shift operator to move said clutch to said first drive position a predetermined time before said speeds of said members are substantially equal.

9. The synchronizer of claim 8 wherein said predetermined time is between about 100 and 400 milliseconds.

10. The synchronizer of claim 8 wherein said clutch is a dog clutch bi-directionally translatable along splines disposed on said output member.

11. The synchronizer of claim 8 wherein said first and second speeds sensors are Hall effect sensors disposed in sensing relationship which tone wheels disposed on said respective input and output members.

12. The synchronizer of claim 8 wherein said microprocessor computes the decrease per unit time in the speed of the input member, extrapolates, based upon such rate of decrease when said shaft speeds will be equal and activating said shift operator a predetermined time before such speeds of said members are equal.

13. The synchronizer of claim 8 wherein said unit of time is between 10 and 40 milliseconds and said predetermined time is between 100 and 400 milliseconds.

14. The method of achieving a synchronized upshift of a two speed drive assembly having an input shaft and an output shaft, comprising the steps of, providing a first speed sensor for sensing the speed of said input shaft, providing a second sensor for sensing the speed of said output shaft, providing a clutch operably disposed between such two speed drive assembly and said output shaft and an operator for controlling such clutch, and providing a microprocessor for receiving such signals, computing the rate of change of said input shaft, determining from said rate of change of said input shaft speed when said input speed and said output speed will be substantially equal and activating such clutch operator at a predetermined time before said speeds are equal.

15. The method of claim 14 wherein such predetermined time is between 100 and 400 milliseconds.

16. The method of claim 14 further including the step of computing the rate of change of said output shaft.

17. The method of claim 14 wherein said determining step is repeated at least every 10 milliseconds.

18. The method of claim 14 wherein said sensors are Hall effect sensors.

19. A method of achieving a synchronized low to high shift in a transfer case equipped with a two speed gear reduction assembly, comprising the steps of, sensing the speed of a transfer case input shaft, sensing the speed of a transfer case output shaft, determining the rate of change of such input shaft, predicting when the input shaft and output shaft will be substantially synchronized, commencing engagement of a clutch into high gear a predetermined time before the determined time of shaft substantial synchronism.

20. The method claim 19 wherein said predetermined time is equal to the time between activation of said clutch and engagement of such clutch teeth.

21. The method of claim 19 further including the step of determining the rate of change of said output shaft.

22. The method of claim 19 further including the step of receiving a command to shift such clutch into neutral.

* * * * *